US007092932B1

(12) United States Patent
Titus

(10) Patent No.: US 7,092,932 B1
(45) Date of Patent: Aug. 15, 2006

(54) SYSTEM AND METHOD FOR PROVIDING AN INTELLIGENT DATABASE ACCESS SEARCHING

(75) Inventor: Scott L. Titus, Shakopee, MN (US)

(73) Assignee: Unisys Corporation, Blue Bell, PA (US)

( * ) Notice: Subject to any disclaimer, the term of this patent is extended or adjusted under 35 U.S.C. 154(b) by 769 days.

(21) Appl. No.: 10/294,097

(22) Filed: Nov. 14, 2002

(51) Int. Cl.
*G06F 7/00* (2006.01)
*G06F 17/30* (2006.01)

(52) U.S. Cl. .................................. 707/2; 707/3; 707/5
(58) Field of Classification Search .................... 707/3, 707/100, 104, 2, 5; 364/200
See application file for complete search history.

(56) References Cited

U.S. PATENT DOCUMENTS 4,956,774 A * 9/1990 Shibamiya et al. ............ 707/2
6,026,409 A * 2/2000 Blumenthal .............. 707/104.1

OTHER PUBLICATIONS

Omiecinski, "CS 4420 Database Project", Georgia Institute of Technology, Jan. 26, 2000.*
Lehman et al., "A Study of Index Structures for Main Memory Database Management Systems", Proceedings of the Twelfth International Conference on Very Large Data Bases, 1986.*
Hellerstien et al., "Generalized Search Trees for Database Systems", Proceedings of the 21st VLDB Conference, 1995.*

* cited by examiner

*Primary Examiner*—Jeffrey Gaffin
*Assistant Examiner*—Michael J. Hicks
(74) *Attorney, Agent, or Firm*—Beth L. McMahon; Charles A. Johnson; Mark T. Starr

(57) ABSTRACT

Database access operations require a process of first locating a database of data that contains requested data and then retrieving the requested data from within the database table. The database tables are stored within a database file that contains an index structure to assist in the determination of the location of the table within the file. Depending upon the structure of the tables and their location within the database file, different searching methods may be used to determine the location of the table. Each searching method results in a different processing efficiency for the search. However, the most efficient searching methodologies operate only on database files having a preferred structure. The least efficient searching methodologies will operate on all database files. The present invention determines the most efficient searching methodology that is supported by a database file when it is registered with a processing system. Database accesses to data within the database file is performed using the determined search methodology supported by the particular database file.

26 Claims, 7 Drawing Sheets

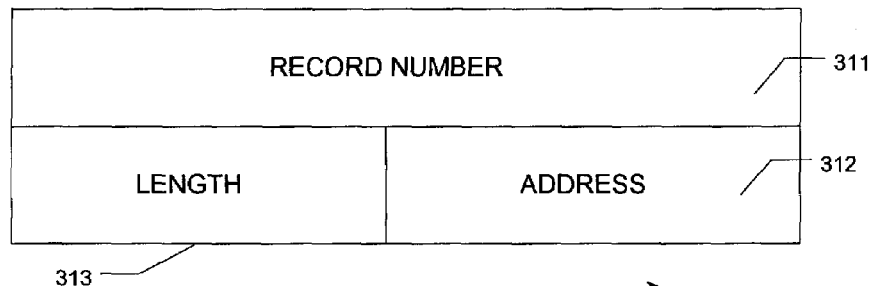
Fig. 3a
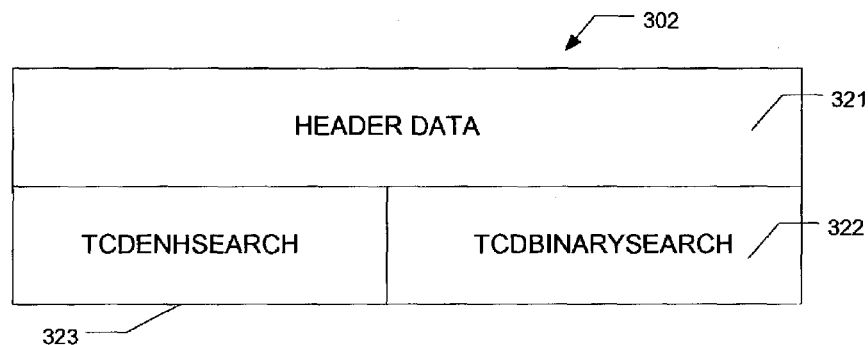
Fig. 3b
| Search Type | TCDENHSEARCH | TCDBINARYSEARCH |
|---|---|---|
| Sequential | 0 | N/A |
| Binary | 1 | 1 |
| Indexing | 1 | 0 |
Fig. 3c

SYSTEM AND METHOD FOR PROVIDING AN INTELLIGENT DATABASE ACCESS SEARCHING

TECHNICAL FIELD

This invention relates in general to a method and apparatus to provide access to data stored within a database, and more particularly to a method and apparatus for providing an intelligent database access data searching using a plurality of searching mechanisms.

BACKGROUND

When multiple database access processes located on a common system perform sequential database access searches simultaneously on a common database file, each search instruction takes an excessive amount of time. Each individual process needs to lock the memory block it is working on. If all processes are attempting to simultaneously access the same memory block, the instructions accessing the memory will take an extraordinary amount of time.

The prior solution used for searching a set of index items in the database file is sequential searching. This type of searching involves starting at the beginning of the index item list and comparing the first item with the requested record number. If they match, then the search is complete. If they don't match, the next item is considered. The process of going to the next item in the index item list if the current item does not match continues until either the end of the list is encountered or else until a match is found. If the end of the list is reached without a match, an error is returned to the application. If a match is found, the search is complete and the processing of the request continues. Other searching mechanisms may be used if the database file has been organized in a manner that supports these other searching mechanisms.

SUMMARY

To overcome the limitations in the prior art described above, and to overcome other limitations that will become apparent upon reading and understanding the present specification, the present invention discloses method and apparatus for providing an intelligent database access data searching using a plurality of searching mechanisms.

Database access operations require a process of first locating a database of data that contains requested data and then retrieving the requested data from within the database table. The database tables are stored within a database file that contains an index structure to assist in the determination of the location of the table within the file. Depending upon the structure of the tables and their location within the database file, different searching methods may be used to determine the location of the table. Each searching method results in a different processing efficiency for the search. However, the most efficient searching methodologies operate only on database files having a preferred structure. The least efficient searching methodologies will operate on all database files. The present invention determines the most efficient searching methodology that is supported by a database file when it is registered with a processing system. Database accesses to data within the database file is performed using the determined search methodology supported by the particular database file.

A system in accordance with the principles of the present invention includes a system for providing an intelligent database access data searching using a plurality of searching mechanisms to data stored within a database file. The database file has a file header, a plurality of index items, and a plurality of tables corresponding to the plurality of index items. The system itself includes a database access file search method determination module, the database access file search method determination module registers a database file for use in providing data to requesting users; a database access read/write module, the database access read/write module receives database access requests and returns requested data; a searching selection module, the searching selection module determines a most efficient searching methodology from a plurality of searching methodologies for use in responding to database access requests; and the plurality of searching methodology search modules.

Other embodiments of a system in accordance with the principles of the invention may include alternative or optional additional aspects. One such aspect of the present invention is a method for providing an intelligent database access data searching using a plurality of searching mechanisms. The method registers a database file for use in a processing system, registering the database file comprises reading the contents of the database file to determine characteristics of database records contained therein; determines a searching methodology for use in the accessing data within the database, the determined searching methodology is selected from a plurality of possible searching methodologies using the characteristics determined from the database records; and accesses data within the database records of the database file using the determined searching methodology.

Another aspect of the present invention is a method for retrieving data from a table within a database file. The database file has a file header, a plurality of index items, and a plurality of tables corresponding to the plurality of index items. The method receives a database access request; retrieves two flags from the file header; selects a searching methodology from a plurality of searching methodologies based upon the contents of the two flags; and retrieves the data from the database table using the selected searching methodology and returning the data.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIGS. 3a–c illustrates a set of data record formats used within a computing system for providing an intelligent database access searching process according to an example embodiment of the present invention.

DETAILED DESCRIPTION

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

Figure 1:
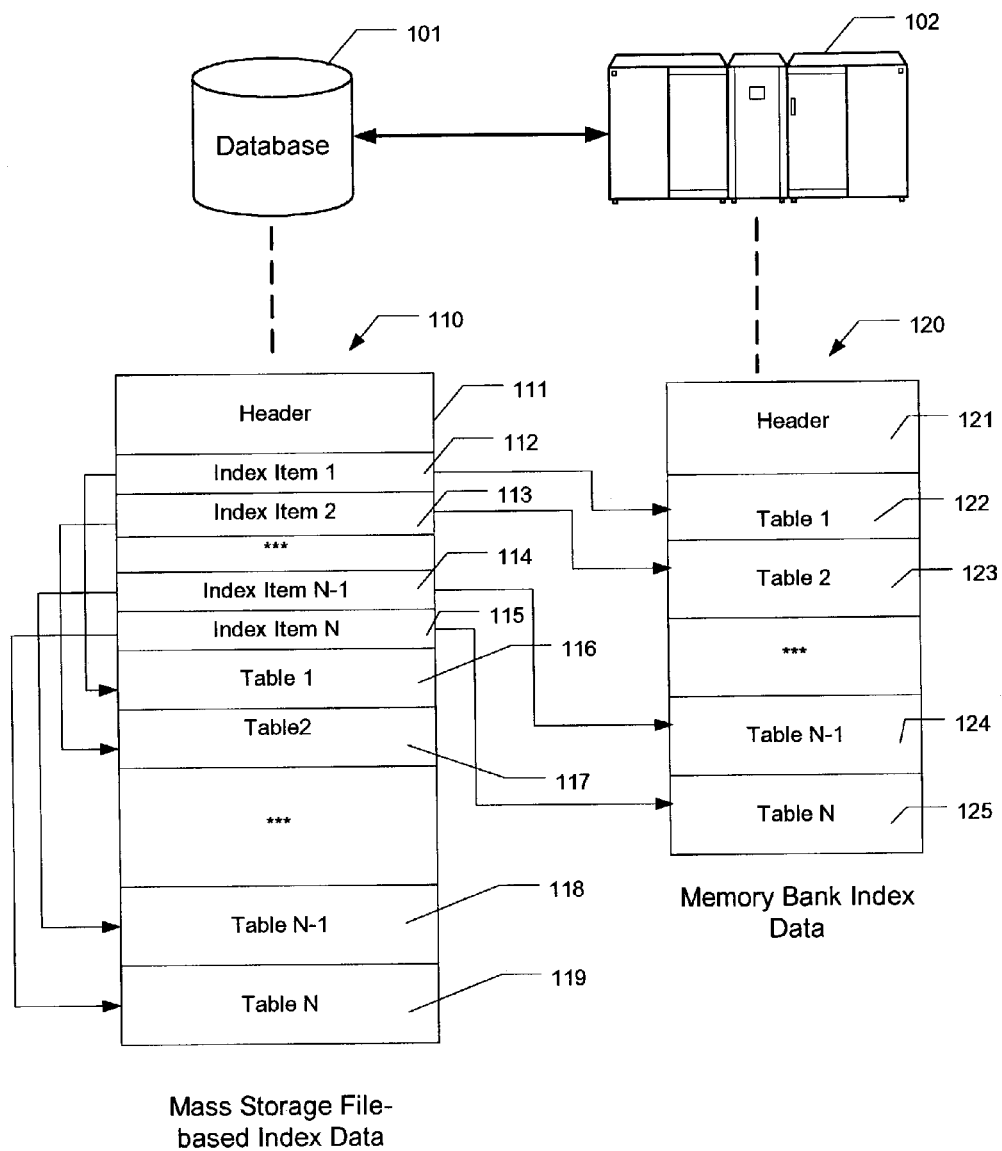
FIG. 1 illustrates a computing system for providing an intelligent database access searching process according to an example embodiment of the present invention.

The present invention provides a method and apparatus for providing an intelligent database access data searching using a plurality of searching mechanisms. FIG. 1 illustrates a computing system for providing an intelligent database access searching process according to an example embodiment of the present invention. A database 101, managed by a large computing system 102, typically a networked-based server system, is typically used to provide access to data stored within the database 101 to remote users or processes (not shown). The remote users transmit a database query to the server 102 that defines a request for specific data within the database 101. The server 102 processes the query to identify the location of the requested data within the database to permit the requested data to be retrieved from a database table for return to the requesting user.

The database 101 is typically stored as a database file 110 that is stored on mass storage devices attached to the server 102. During the operation of the server 102 as a database processing system, a version of the database file 110 is processed and created as a RAM-based Memory Bank Index Data 120 within the server 102. The RAM-based version of the database is used to increase the processing efficiency of the system as access to data stored within RAM is significantly faster than accessing data stored within a mass storage device. Additional details of the operation and storage of these software based processes are described below in reference to FIG. 2.

In a preferred embodiment of the present invention, the database file corresponds to a TIP Common Bank Data File that is used as part of a database system provided by the Unisys Corporation. TCDBF files, TIP Common Data Bank Files, are similar to memory files in that a copy of at least part of the file exists in memory. The memory portion of the file is setup into tables. Each table has control information located in the file header, the index item, which has the starting record in the file, the number of records for the table, and the corresponding bank offset within the file's memory bank.

The file portion is no different than a regular TIP File Control Super Structure (FCSS) file in that the file is divided into records of a preset size. A File Control Super Structure provides the primary access method for TIP files in the preferred embodiment of the present invention. Unlike a typical FCSS file, a TCDBF has a header at the beginning of the file that contains specific information related to the TCDBF and a list of tables defined within the TCDBF. It is within this list of tables, the index items, in which the enhanced searching is performed.

When an FCSS access, using a record number, is performed against a TCDBF, the operating system retrieves the data from the bank if possible, or writes the data to the bank if possible and to the file. In order for the system to determine if the access can be done on the bank portion, the index item table must be searched. If the requested record fits within a table, a read request retrieves the information from the bank, which is much faster than retrieving the data from the file. If the request is a write, and it is within a table, the bank and the file are updated to keep them consistent.

At the time a TCDBF file is registered and made available as a TCDBF to the system, the file is searched to see if either direct indexing or binary searching can be performed against the file during application accesses; the data access may be either a read operation or a write operation. If direct indexing can be performed against the file, the direct indexing bit is set in the header. If direct indexing cannot be performed, the file is checked to see if binary searching can be performed. If so, the binary searching bit is set in the header. In order to reduce the impact the main pass accesses to TCDBF files that cannot support either enhanced searches, which include direct indexing or binary searching, an enhanced searching bit is set in the header if either direct indexing or binary searching can be performed against the file.

The following requirements must be met for the binary search to apply:

At least 4 tables must be defined.

All defined tables are sequentially ordered by record number in the TIP file.

Holes within the database file cannot exist. Holes are defined as index items that are included in the TCDBF header but have a size of zero.

Along with the binary search requirements, the following additional requirements must be met in order for direct indexing to apply:

At least 2 tables must be defined.

All defined tables are the same distance apart in the TIP file.

Direct indexing takes precedence over binary searching. Because of this, direct indexing has a lower table count requirement than binary searching does. During TCDBF accesses using FCSS functions, the enhanced bit in the TCDBF header is checked. If it is not set, sequential searching takes place and the file access completes. If the enhanced searching bit is set, then the other searching bits are checked.

With the direct indexing bit set, the table number is calculated by dividing the requested record number by the number of records in each table. In order to get the bank address, the table control information is accessed based on the table number and the starting address is retrieved.

With the binary searching bit set, a typical binary search is performed. First, the midpoint table is calculated and the TIP record number for the table is compared with the requested record number. If the requested record is greater than the TIP record for the midpoint table, then the remaining tables above the current midpoint are checked in the same manner. If the requested record is less than the current midpoint table record, then the remaining tables below the current midpoint are checked. Searching in this manner continues until a matching table is found, or if a match is not found, an error is returned to the application. If a match is found, then searching is complete, the bank address is retrieved from the matching table control information and the access completes.

One skilled in the art will recognize that other database files that contain the characteristics of the files discussed herein may be used in place of the TCDBF file of the preferred embodiment without deviating from the spirit and scope of the present invention as recited within the attached claims.

Figure 2:
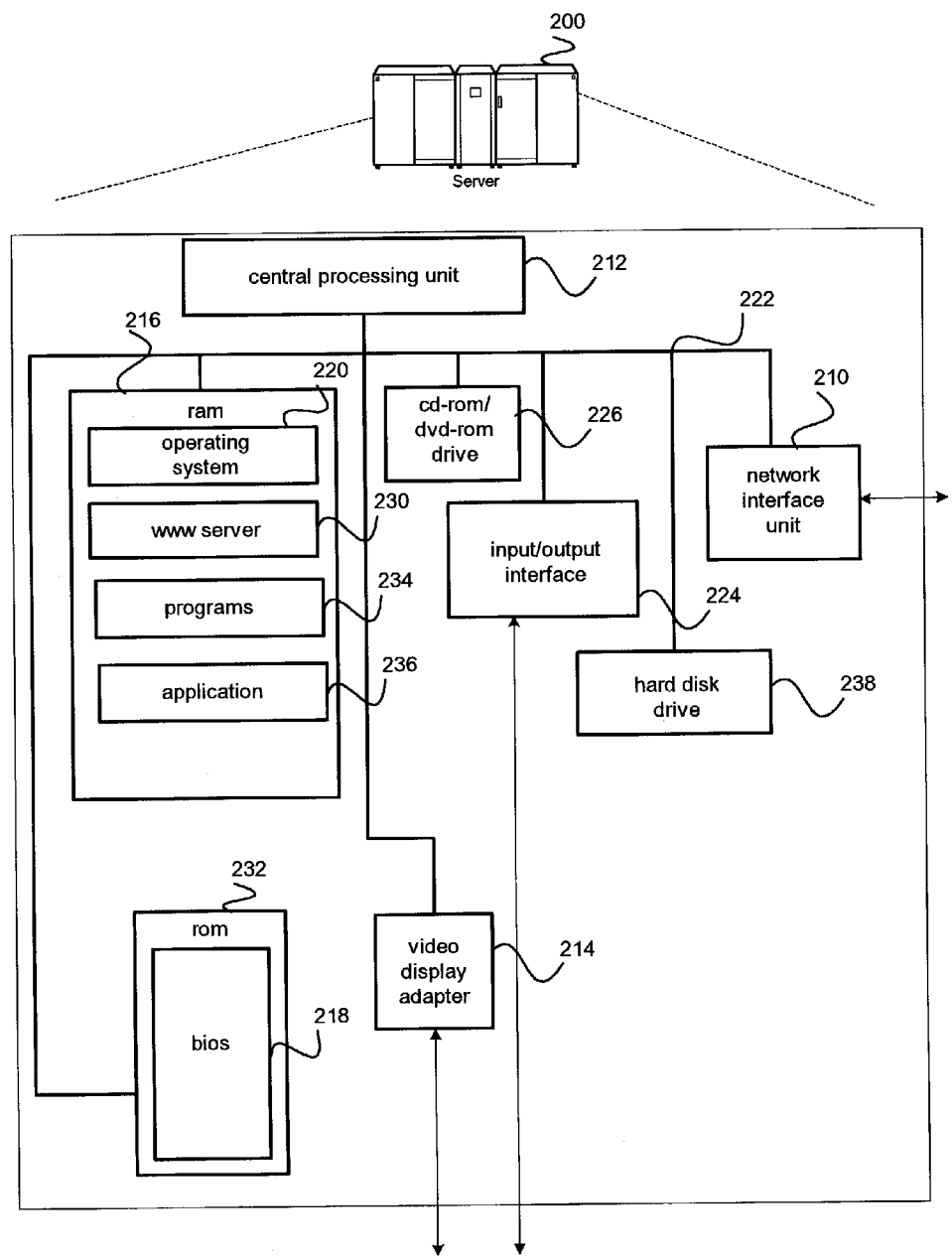
FIG. 2 illustrates a general purpose computing system used to provide a typical computing environment to provide an intelligent database access searching process according to an example embodiment of the present invention.

FIG. 2 shows an exemplary server 200 that is operative to provide a database access to users. Accordingly, the server 200 receives a request for data contained within a database and the server 200 performs a look up of the data from within one of its database tables. The retrieved data would then be returned to the requesting user of process. These transactions may take place over any network, including the Internet or some other communications network known to those skilled in the art.

Those of ordinary skill in the art will appreciate that the server 200 may include many more components than those shown in FIG. 2. However, the components shown are sufficient to disclose an illustrative embodiment for practicing the present invention. As shown in FIG. 2, the server 200 is connected to a communications network, via network interface unit 210. Those of ordinary skill in the art will appreciate that network interface unit 210 includes the necessary circuitry for connecting the server 200 to the network, and is constructed for use with various communication protocols including the TCP/IP protocol. Typically, network interface unit 210 is a card contained within the server 200.

Server 200 also includes processing unit 212, video display adapter 214, and a mass memory, all connected via bus 222. The mass memory generally includes RAM 216, ROM 232, and one or more permanent mass storage devices, such as hard disk drive 228, a tape drive, CD-ROM/DVD-ROM drive 226, and/or a floppy disk drive. The mass memory stores operating system 220 for controlling the operation of the server 200. It will be appreciated that this component may comprise a general purpose server operating system as is known to those of ordinary skill in the art, such as UNIX, LINUX™, or Microsoft WINDOWS NT®. Basic input/output system ("BIOS") 218 is also provided for controlling the low-level operation of the server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for providing a database processing system. More specifically, the mass memory stores applications including the server application program 230, programs 234, and an intelligent database access searching application 236. Server application program 230 includes computer executable instructions which, when executed by the server computer 200, generate responses to database access queries, including performing the logic described above.

Server 200 also comprises input/output interface 224 for communicating with external devices, such as a mouse, keyboard, scanner, or other input devices not shown in FIG. 2. Likewise, the server 200 may further comprise additional mass storage facilities such as CD-ROM/DVD-ROM drive 226 and hard disk drive 228. Hard disk drive 228 is utilized by server 200 to store, among other things, application programs, databases, and program data used by server application program 230. For example, customer databases, product databases, image databases, and relational databases may be stored. The operation and implementation of these databases is well known to those skilled in the art.

FIGS. 3a–c illustrate a set of data record formats used within a computing system for providing an intelligent database access searching process according to an example embodiment of the present invention. In the processing discussed above with reference to FIG. 1, an index item 112–115 is used in the accessing of the data within the mass-storage 110 and memory bank 120 database files. This index item 301, shown in FIG. 3a, possesses a set format that includes a record number field 311, a record length field 313, and an address field 312. The a record number field 311 contains a reference to the record number in which the corresponding table data will be found within the mass storage file 120 of the database. The record length field 313 contains a reference to the number of records that are used to store the particular table. The address field 312 contains a reference to a corresponding address in the memory bank data where the corresponding table may be found.

Using the FIG. 1 diagram as an example, the index item 2 113 contains the record number where table 2 117 is found in the mass storage data file in its record number field 311. The index item 2 113 also contains a length value for the size of table 2 as it is stored in both the mass storage data file and the memory bank data in the length field 313. Finally, the index item 2 113 contains RAM address corresponding to Table 2 123 in the memory bank index data 120 in its address field 312. A complete definition of this record is shown below in Table 1:

TABLE 1

TCDBF INDEX ITEM

| 0 | length [TCDINS] | table_address [TCDINA] |
|---|---|---|
| 01 | record_number [TCDINR] | |

Word 0
  Bit 0–Word 01, Bit 35 tcdbf_index_item:
  Bits 0–17 length: UNSIGNED INTEGER [TCDINS]
  The number of words in this table.
  Bits 18–35 table_address: UNSIGNED INTEGER [TCDINA]
  The table address relative to the bank start.

Word 01
  Bits 0–35 record_number: SIGNED INTEGER [TCDINR]
  The starting record number of the table in the TIP file.

Within both files 110, 120, the data includes a file header 302, shown in FIG. 2b, that contains data used to define various attributes of the file. The present invention adds two additional fields to this file header 302 in addition to a standard file header 321. These new fields include a TCD Enhanced Search Flag 323 and a TCD Binary Search Flag 322. These two flags are used to define the type of index searching that may be used by a processing system that accesses data stored within the file. The particular searching type used according to the settings of these two flags 322–323 are defined in the table 303, shown in FIG. 3c.

The full definition of a TCDBF file header used in a preferred embodiment of the present invention is shown below in Table 2:

TABLE 2

TCDBF HEADER

| Word | Field |
|---|---|
| 0 | tcdbf_keyword [TCDKEY] |
| 01 | (reserved) | 18 | 19 | * | (reserved) | * [TCDVER] |
| 02 | tcdbf_bdi [TCDBDI] | tcdbf_words_record [TCDWPR] |
| 03 | tcdbf_bank_size [TCDSIZ] | tcdbf_lower_limit [TCDBAS] |
| 04 | tcdbf_file_number [TCDFIL] | * | 20 | 21 | 22 | 23 | tcdbf_iord [TCDTYP] | * | [TCDCHK] |
| 05 | tcdbf_header_size [TCDISV] | number_of_items [TCDINM] |
| 06 | tcdbf_name [TCDNAM] |

Word 0

Bit 0–Word 06, Bit 35 tcdbf_header:

Bits 0–35 tcdbf_keyword: FIELDATA CHARACTER [TCDKEY]

The TCDBF keyword: contains 'TCDBF$' This field is set by FREIPS TCDCREATE and is currently not verified by Exec.

Word 01

Bits 0–17—(reserved): LOGICAL

Reserved

Bits 18–23—tcdbf_local_flags: [TCDLCLFLG]

The following TCDBF flag definitions are specific to TCDBF files.

Bit 18—enhanced_search_tcdbf: LOGICAL [TCDENHSRCH]

This flag is used to determine which search method is used to find the bank offset in the TCDBF bank for FCSS requests. It is set by the Exec when the TCDBF is registered.

The following conditions must apply in order for this flag to be set:

At least TCDINDXMIN defined tables exist.

All defined tables are sequentially ordered by record number in the TIP File.

Holes do not exist (Index items that occur before the last item which are not defined.)

If any condition above is not met, the flag will be clear. This indicates that a sequential search will be done against the TCDBF.

If all conditions apply, either a binary search or direct indexing will be done against the TCDBF, depending on the setting of the TCDBINSRCH flag.

The following table combines the TCDENHSRCH and TCDBINSRCH flags.

| Search | TCDENHSRCH | TCDBINSRCH |
|---|---|---|
| Sequential | 0 | N/A |
| Binary | 1 | 1 |
| Indexing | 1 | 0 |

Bit 19 binary_search_tcdbf: LOGICAL [TCDBINSRCH]

This flag is used to determine which search method is used to find the bank offset in the TCDBF bank for FCSS requests. It is set by the Exec when the TCDBF is registered.

If this flag is set, a binary search will be done on the TCDBF to find the offset into the bank.

The following requirements must be set in in order for this flag to be set:

At least TCDBINMIN defined tables exist.

All defined tables are sequentially ordered by record number in the TIP File.

Holes do not exist (Index items that occur before the last item which are not defined.)

If this flag is clear (and TCDENHSRCH is set,) then direct indexing will be done against the TCDBF. The following requirements must be set for this state to exist:

At least TCDINDXMIN defined tables exist.

All defined tables are the same distance apart in the TIP file.

All defined tables are sequentially ordered by record number in the TIP File.

Holes do not exist (Index items that occur before the last item which are not defined.)

The following table combines the TCDENHSRCH and TCDBINSRCH flags.

| Search | TCDENHSRCH | TCDBINSRCH |
|---|---|---|
| Sequential | 0 | N/A |
| Binary | 1 | 1 |
| Indexing | 1 | 0 |

Bits 20–23—(reserved): LOGICAL
Reserved.

Bits 24–29—(reserved): LOGICAL
Reserved.

Bits 30–35—tcdbf_version: UNSIGNED INTEGER [TCDVER]

TCDBF Header Version Number. This field is set by FREIPS TCDCREATE and is reset by Exec and not verified during registration.

Word 02

Bits 0–17—tcdbf_bdi: UNSIGNED INTEGER [TCDBDI]
Common bank BDI (in EBDI format)

Bits 18–35—tcdbf_words_record: UNSIGNED INTEGER [TCDWPR]
Words per record for this TIP file. This is inserted when the TCDBF is registered.

Word 03

Bits 0–17—tcdbf_bank_size: UNSIGNED INTEGER [TCDSIZ]
Size in words of the TCDBF bank.

Bits 18–35—tcdbf_lower_limit: UNSIGNED INTEGER [TCDBAS]
The base (lower limit) of the TCDBF bank.

Word 04

Bits 0–17—tcdbf_file_number: UNSIGNED INTEGER [TCDFIL]
The TIP file number of the TCDBF.

Bits 18–23—tcdbf_flags: [TCDFLG]
Miscellaneous TCDBF flags.
These TCDBF flag definitions are the same as the TIP file directory cell tcdbf_flags (formerly FDTCFLGS). Code which references both of these cells does so interchangeably. Therefore, any changes to this cell must be reflected in the TIP file directory cell or (preferably) the interchangeable coding dependency must be eliminated.

Bits 18–19—(reserved): LOGICAL
Reserved.

Bit 20—checkpoint_tcdbf: CONDITION [TCDCHKFLG]
Checkpoint TCDBF flag.

Bit 21—dynamic_tcdbf: CONDITION [TCDDYN]
Dynamic BDI TCDBF flag.

Bit 22—lbdi_tcdbf: CONDITION [TCDLBDI]
L,BDI format TCDBF flag.

Bit 23—volatile_tcdbf: CONDITION [TCDVT]
Volatile TCDBF flag.

Bits 24–29—tcdbf_iord: UNSIGNED INTEGER [TCDTYP]
Indicator whether the bank is an I or D bank. TCDTYP is non-zero if a Dbank.

Bits 30–35—tcdbf_checkpoint_interval: UNSIGNED INTEGER [TCDCHK]
The number of six-second DAPA intervals between checkpoints. Legal values allowed are in the range of 0 to 63.
If zero, the automatic checkpoint dump is not performed. This must be non-zero if file is recoverable.

Word 05

Bits 0–17—tcdbf_header_size: UNSIGNED INTEGER [TCDISZ]
Size of the TCDBF header including: the fixed area and all of the index items.

Bits 18–35—number_of_items: LOGICAL [TCDINM]
The number of tables (index items) defined in the TCDBF.

Word 06

Bits 0–35—tcdbf_name: FIELDATA CHARACTER [TCDNAM]
The name of the bank. This is used for site identification purposes only (e.g. console messages).

Figure 4:
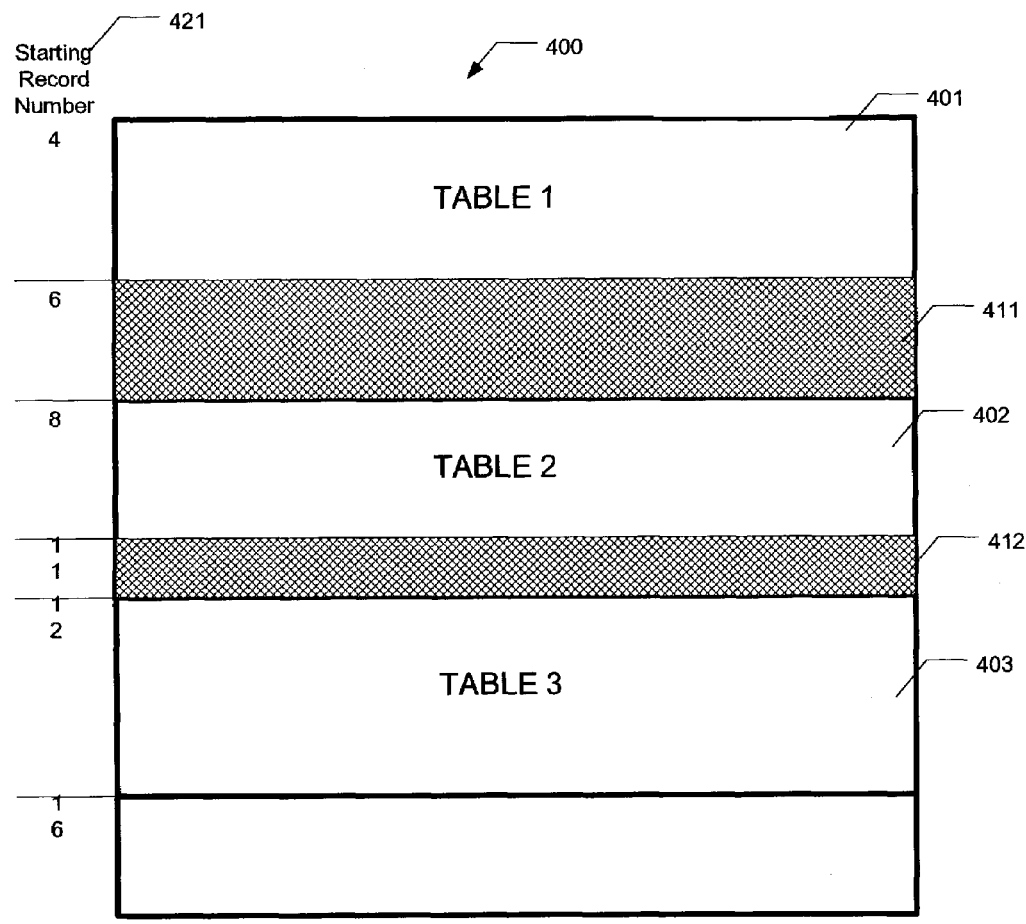
FIG. 4 illustrates an example database file formatted in accordance with another example embodiment of the present invention.

FIG. 4 illustrates an example database file formatted in accordance with another example embodiment of the present invention. The particular set of index table searching is needed because the format of a TCDBF file 400 allows for the use of tables that do not utilize all of the available storage within file while placing the tables on fixed record boundaries. This characteristic leads to the possible arrangements illustrated in FIG. 4. The first table, Table 1 401 begins at a particular record number 421 that corresponds to record 4. This table 401 uses only two records and ends at the record 5. Unused storage exists 411 within records 6–7 before the beginning of Table 2 402 at record 8. In this example, all of the tables are allocated 4 records, even though they may use only a portion of these records. Table 2 402 uses 3 of the 4 records allocated to it and also contains a portion of unused storage 412. Table 3 402, in contrast, uses all of the allocated storage.

Because this structure is present in some TCDBF files, the processing that searches these files to find data within the tables must take into account these factors as well as fixed structure of the files. The use of the starting record number and the length to find the desired table within the mass storage file and the address pointer to the memory bank file and the length to define the tables will provide a complete definition of the tables regardless of the searching mechanism used to find the table.

Figure 5:
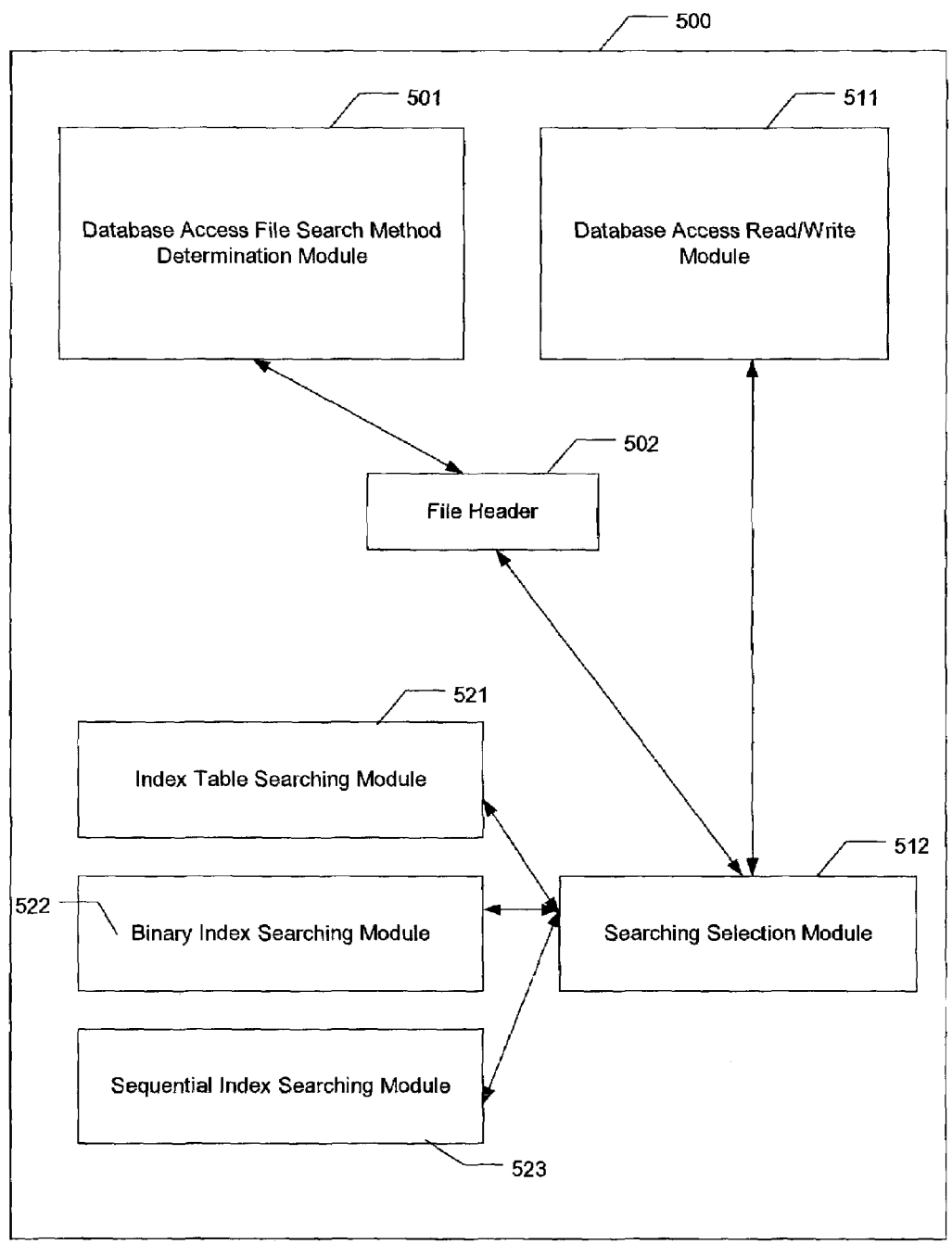
FIG. 5 Illustrates an example set of processing modules for use within a computing system to provide an intelligent database access searching process according to an example embodiment of the present invention.

FIG. 5 illustrates an example set of processing modules for use within a computing system to provide an intelligent database access searching process according to an example embodiment of the present invention. A database data access processing system 500 comprises a number of processing modules that perform the operations necessary to complete the data access operations. The database data access processing system 500 includes a database access file search method determination module 501, a database file header 502, a database access read/write module 511, a searching selection module 512, an index table searching module 521, a binary index searching module 522, and a sequential index searching module 523.

The database access file search method determination module 501 processes a TCDBF file during the files registration to a system to determine if the conditions are met that will support the use of index searching and binary searching. The database file is read and processed as described below in reference to FIG. 7 to determine the type of searching that may occur because of the contents of the database file. Once the processing is complete the database access file search method determination module 501 sets the appropriate flag fields within the file header 502 of the database file for use when the file is accessed.

The database access read/write module 511 receives and processes database data access requests to obtain the requested data from the file for return to a requesting user or process. database access read/write module 511 interacts with the searching selection module 512 to access and retrieve the requested data.

The searching selection module 512 receives data access requests from the database access read/write module 511 that request data from a particular database file. This module 512 reads the searching flags set within the file header 502 that when the database file is registered to determine which type of searching is to be performed. Index searching is preferred. If index searching is not possible, then binary searching is performed. If conditions to allow binary search do not exist, the data access uses sequential searching.

The index table searching module 521 performs an index search to locate the requested data from the database file when index searching is possible. The binary index searching module 522 performs a binary search to locate the requested data from the database file when binary and not index searching is possible, and a sequential index searching module 523 performs a sequential search to locate the requested data from the database file when no other type of searching is possible. Each of these modules return the requested data to the requesting user.

Figure 6:
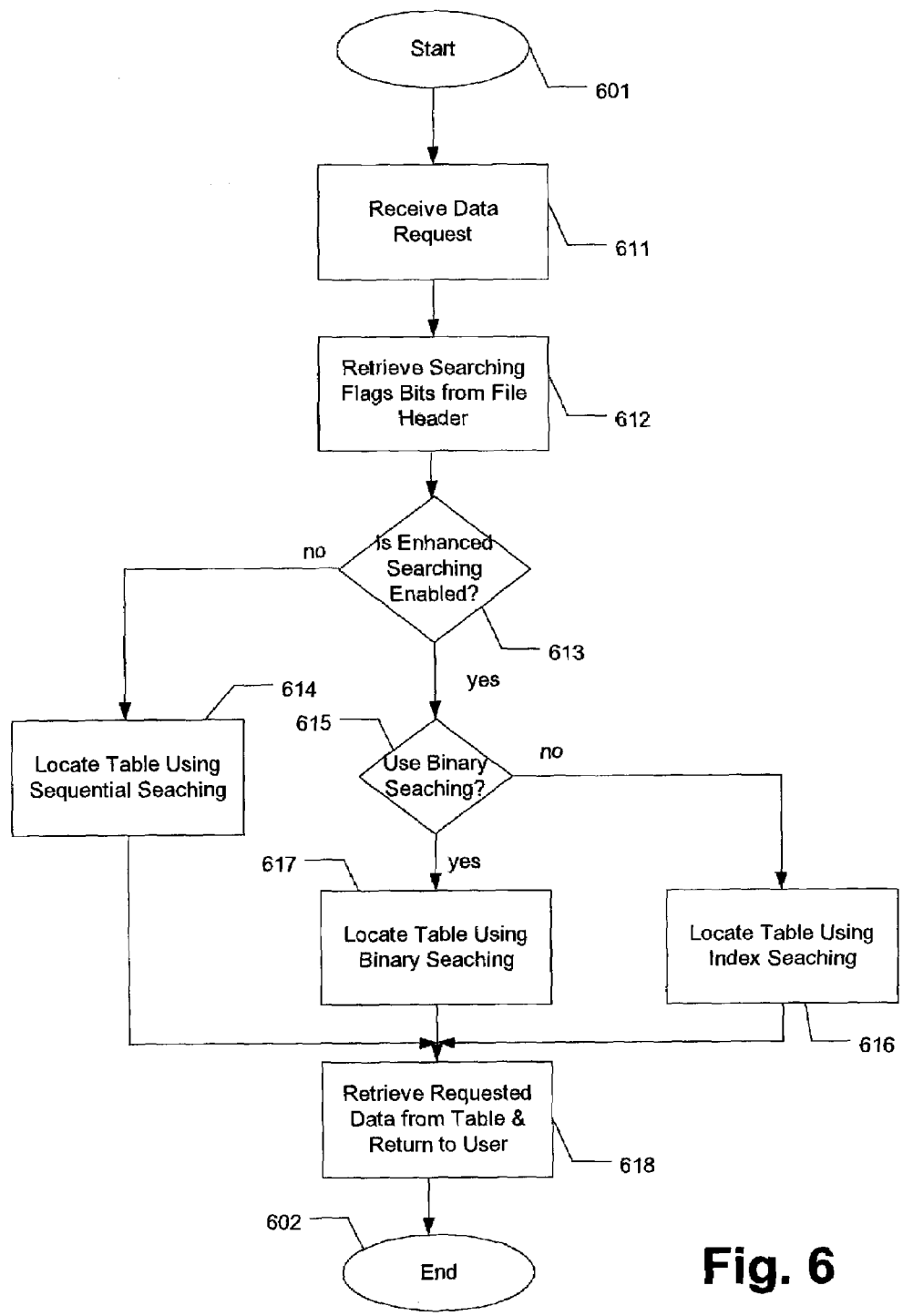
FIG. 6 illustrates an operational flow for a process of processing a data record request within an intelligent database access searching process according to an example embodiment of the present invention.

FIG. 6 illustrates an operational flow for a process of processing a data record request within an intelligent database access searching process according to an example embodiment of the present invention. When a database access is requested, the processing starts 601 and the data access request is received within module 611. This request will identify the database file that is to be accessed. Module 612 will then retrieve the two searching flag bits from the file header of the database file to determine the type of searching that may be performed for this data access.

Test module 613 determines if enhanced searching is possible. This test module 613 uses the TCDENHSRCH field for this determination. If the test module 613 determines that an enhanced search is not possible, the processing proceeds to module 614. This processing module 614 locates the table containing the requested data using a sequential search. A sequential search is the least preferred searching method. Once the search is complete, the requested data is retrieved in module 618 and the processing ends 602.

If test module 613 determines that an enhanced search is possible, test module 615 determines if a binary search to be performed. This test module 615 uses the TCDBINSRCH flag in the file header for the database file to determine if a binary search is to be performed. If test module 615 determines that a binary search is to be performed, a binary search is used by module 617 to locate the requested data. Once the search is complete, the requested data is retrieved in module 618 and the processing ends 602.

If test module 615 determines that a binary search is not to be performed, an index search is used by module 616 to locate the requested data. An index search is the most preferred searching method. Once the search is complete, the requested data is retrieved in module 618 and the processing ends 602.

Figure 7:
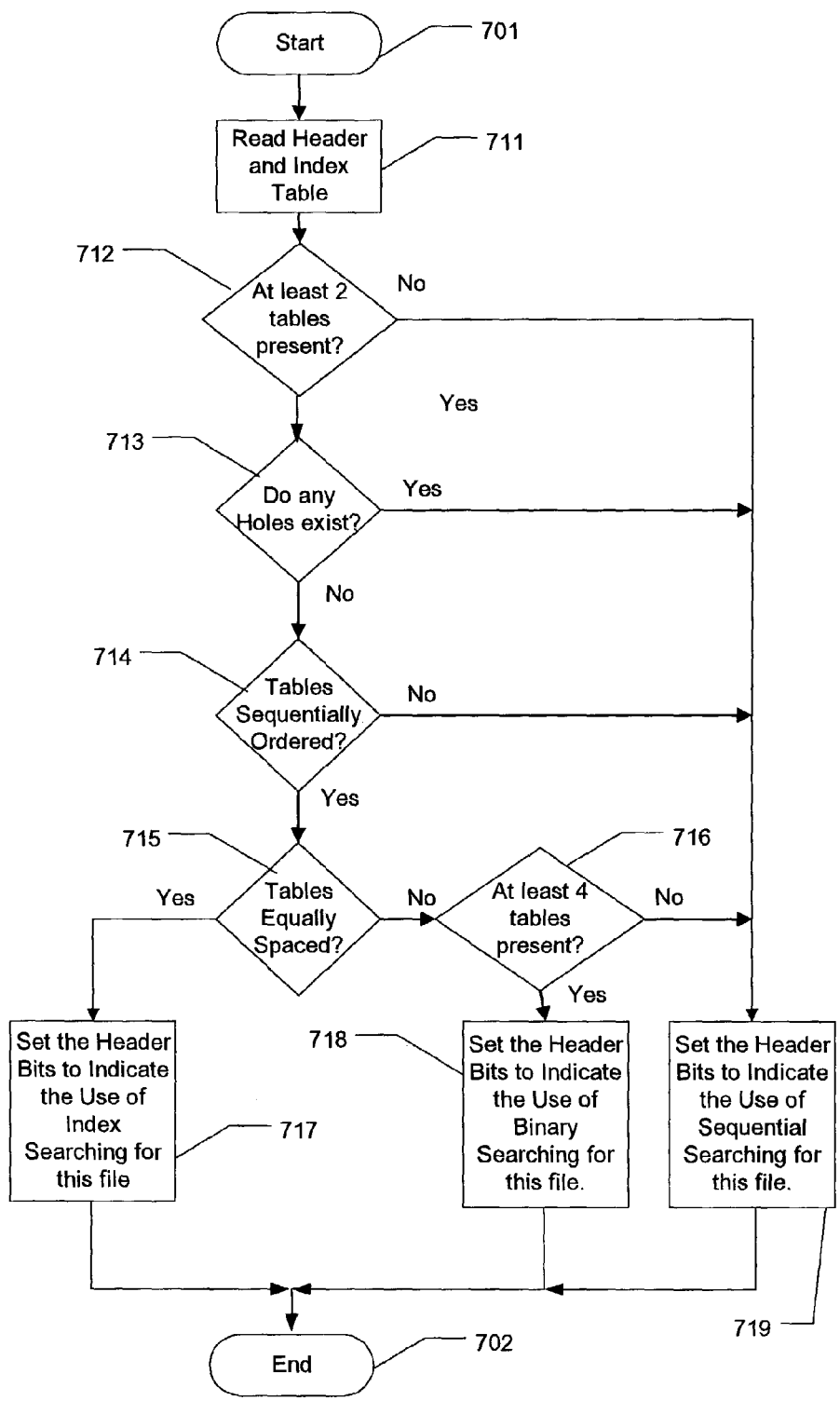
FIG. 7 illustrates an operational flow for a process of scanning a database file to determine the types of access searching that may be supported when accessing data within the file using an intelligent database access searching process according to an example embodiment of the present invention.

FIG. 7 illustrates an operational flow for a process of scanning a database file to determine the types of access searching that may be supported when accessing data within the file using an intelligent database access searching process according to an example embodiment of the present invention. As discussed above, when a database file is registered for use in a database processing system, the database file may be checked to determine whether the contents of the database file will support any number of searching methodologies. In the registration process, the processing starts 701 and the database file is read as a sequence of database records in module 711. Once the characteristics of these records are known, test module 712 determines if there are at least 2 tables.

If test module 712 determines that there are not at least 2 tables, the processing proceeds to module 719. Module 719 notes that conditions within the database file will only support sequential searching and the two header flags, TCDENHSRCH and TCDBINSEARCH, are set to indicate this determination before the processing ends 702.

If test module 712 determines that there are at least 2 tables within the database file, the processing proceeds to test module 713. Test module 713 determines if a second condition is met for some form of enhanced searching to be performed. Test module 713 determines whether any holes exist within the database files. A hole is defined as index items within the database file that are included in the file header but have a size of zero. It test module 713 determines that at least one hole exists, the processing again proceeds to module 719 to once again note that conditions within the database file will only support sequential searching. The two header flags, TCDENHSRCH and TCDBINSEARCH, are set to indicate this determination before the processing ends 702.

If test module 713 determines that no holes exist within the database file, the processing continues to test modules 714 to determine the tables within the database file are sequentially ordered by the record numbers. It test module 714 determines that at least one table is not sequentially ordered, the processing proceeds to module 719 to once again note that conditions within the database file will only support sequential searching. The two header flags, TCDENHSRCH and TCDBINSEARCH, are set to indicate this determination before the processing ends 702.

If test module 714 determines that the tables within the database file are sequentially ordered, the processing continues to test modules 715 to determine the tables within the database file are equally spaced by the number of records allocated for each table. If test module 714 determines that the tables are equally spaced in the database file, index searching is to be used. In this case, module 717 sets the two header flags, TCDENHSRCH and TCDBINSEARCH, to indicate the use of index searching and the processing ends 702.

If either test module 714 determines that at least one table is not equally spaced within the database file, the processing proceeds to test module 716. Test module 716 determines if at least 4 tables are present in within the database file. This test determines if the final requirement for binary searching is met. If test module 716 determines that at least 4 tables are present, module 718 sets the two header flags, TCDENHSRCH and TCDBINSEARCH, to indicate the use of binary searching and the processing ends 702. Otherwise, module 719 sets the two header flags, TCDENHSRCH and TCDBINSEARCH, to indicate the use of sequential searching and the processing ends 702.

The embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

While the above embodiments of the present invention describe a system and method for providing an intelligent database access data searching using a plurality of searching mechanisms, one skilled in the are will recognize that the use of the processing system discussed above are merely example embodiments of the present invention. As long as an intelligent database access data searching using a plurality of searching mechanisms is present, the present invention to would be useable in other data processing systems. It is to be understood that other embodiments may be utilized and operational changes may be made without departing from the scope of the present invention as recited in the attached claims.

As such, the foregoing description of the exemplary embodiments of the invention has been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. The present invention is presently embodied as a method and a system for providing an intelligent database access data searching using a plurality of searching mechanisms. Since many embodiments of the invention can be made without departing from the spirit and scope of the invention, the invention resides in the claims hereinafter appended.

What is claimed is:

1. A method for providing an intelligent database access data searching using a plurality of searching mechanisms, the method comprises:
    registering a database file for use in a processing system, registering the database file comprises reading the contents of the database file to determine characteristics of database records contained therein and recording the characteristics by updating a state of at least one flag maintained in the database file;
    determining a searching methodology for use in accessing data within the database, the determined searching methodology being selected from a plurality of possible searching methodologies based on the state of the at least one flag; and
    accessing data within the database records of the database file using the determined searching methodology.

2. The method according to claim 1, wherein the plurality of possible searching methodologies comprises sequential searching and enhanced searching.

3. The method according to claim 2, wherein enhanced searching comprises binary searching and index searching.

4. The method according to claim 3, wherein enhanced searching is selected as the determined searching methodology when:
    the characteristics determined from the database records indicate that the database file contains at least two tables;
    the characteristics determined from the database records indicate that the database file contains a set of tables that are sequentially ordered by the record numbers in the database file; and
    the characteristics determined from the database records indicate that the database file contains no holes, a hole being defined as index items within the database file that are included in the file header but have a size of zero.

5. The method according to claim 4, wherein binary searching is selected as the selected type of enhanced searching when enhanced searching is selected and when further:
    the characteristics determined from the database records indicate that the database file contains at least four tables; and
    the characteristics determined from the database records indicate that the tables are not equally spaced within the database file records.

6. The method according to claim 4, wherein index searching is selected as the selected type of enhanced searching when enhanced searching is selected and when further the characteristics determined from the database records indicate that the tables are not equally spaced within the database file records.

7. The method according to claim 2, wherein sequential searching is selected as the determined searching methodology when the characteristics determined from the database records indicate that the database file contains no more than one table.

8. The method according to claim 2, wherein sequential searching is selected as the determined searching methodology when the characteristics determined from the database records indicate that the database file contains a set of tables that are not sequentially ordered by the record numbers in the database file.

9. The method according to claim 2, wherein sequential searching is selected as the determined searching methodology when the characteristics determined from the database records indicate that the database file contains holes, a hole being defined as index items within the database file that are included in the file header but have a size of zero.

10. The method according to claim 1, wherein the at least one flag includes two flags within a header in the database file to indicate the characteristics of the database records in the database file.

11. The method according to claim 10, wherein the two flags comprise a TCDENHSRCH and a TCDBINSRCH flag.

12. A method for retrieving data from a table within a database file, the database file having a file header, a plurality of index items, and a plurality of tables corresponding to the plurality of index items, the method comprises:
    receiving a database access request;
    retrieving a plurality of flags from the file header;
    selecting a searching methodology from a plurality of searching methodologies based upon the contents of the flags; and
    retrieving the data from the database table using the selected searching methodology and returning the data.

13. The method according to claim 12, and further comprising:
    registering the database file; and
    setting the flags to indicate a desired searching methodology.

14. The method according to claim 13, where the registering the database file comprises reading the records within the database file to determine a set of characteristics for the database records.

15. The method according to claim 14, wherein the setting the flags step uses the set of characteristics for the database records.

16. The method according to claim 13, where the desired searching methodology comprises sequential searching and enhanced searching.

17. The method according to claim 16, wherein the enhanced searching comprises binary searching and index searching.

18. The method according to claim 17, wherein enhanced searching is selected as the desired searching methodology when:
    the characteristics determined from the database records indicate that the database file contains at least two tables;

the characteristics determined from the database records indicate that the database file contains a set of tables that are sequentially ordered by the record numbers in the database file; and the characteristics determined from the database records indicate that the database file contains no holes, a hole being defined as index items within the database file that are included in the file header but have a size of zero.

19. The method according to claim 18, wherein binary searching is selected as the selected type of enhanced searching when enhanced searching is selected and when further:

the characteristics determined from the database records indicate that the database file contains at least four tables; and the characteristics determined from the database records indicate that tables are not equally spaced within the database file records.

20. The method according to claim 18, wherein index searching is selected as the selected type of enhanced searching when enhanced searching is selected and when further the characteristics determined from the database records indicate that tables are equally spaced within the database file records.

21. The method according to claim 17, wherein sequential searching is selected as the desired searching methodology when enhanced searching is not used.

22. The method according to claim 12, wherein the flags comprise a TCDENHSRCH and a TCDBINSRCH flag.

23. A system for providing an intelligent database access data searching using a plurality of searching mechanisms to search for data stored within a database file, the database file having a file header, a plurality of index items, and a plurality of tables corresponding to the plurality of index items, the system comprise:

a database access file search method determination module to register the database file and to initialize a plurality of flags stored within the database file to a state that indicates characteristics of the database file;

a database access read/write module to receive database access requests and to return requested data; and a searching selection module to determine, based on the state of the flags, a most efficient searching methodology from a plurality of searching methodologies for use in responding to database access requests.

24. The system according to claim 23, wherein the flags include two flags within the file header of the database file that are set by the database access file search method determination module based upon characteristics of database records examined when the module registers the database file.

25. The system according to claim 23, wherein the searching selection module uses the flags to select the most efficient searching methodology from the plurality of searching methodologies.

26. The system according to claim 25, wherein the plurality of searching methodologies comprise sequential searching, binary searching, and index searching.

* * * * *